US012304540B2

(12) United States Patent
Liu et al.

(10) Patent No.: US 12,304,540 B2
(45) Date of Patent: May 20, 2025

(54) RELATIVE VELOCITY BASED TRAIN PROTECTION METHOD AND APPARATUS

(71) Applicant: BEIJING JIAOTONG UNIVERSITY, Beijing (CN)

(72) Inventors: Hongjie Liu, Beijing (CN); Shuai Su, Beijing (CN); Ming Chai, Beijing (CN); Jidong Lv, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 46 days.

(21) Appl. No.: 18/097,071

(22) PCT Filed: May 24, 2021

(86) PCT No.: PCT/CN2021/095468
§ 371 (c)(1),
(2) Date: Jan. 13, 2023

(87) PCT Pub. No.: WO2022/012166
PCT Pub. Date: Jan. 20, 2022

(65) Prior Publication Data
US 2024/0239389 A1    Jul. 18, 2024

(30) Foreign Application Priority Data
Jul. 14, 2020   (CN) .......................... 202010674429.4

(51) Int. Cl.
B61L 27/20         (2022.01)
B61L 15/00         (2006.01)
(Continued)

(52) U.S. Cl.
CPC .......... B61L 27/20 (2022.01); B61L 15/0062 (2024.01); B61L 15/0072 (2013.01); B61L 21/10 (2013.01);
(Continued)

(58) Field of Classification Search
None
See application file for complete search history.

(56) References Cited

U.S. PATENT DOCUMENTS 6,332,107 B1 * 12/2001 Gordon ............... B61L 15/0058
701/19
9,283,945 B1 *  3/2016 Kernwein ............. B60T 17/228
(Continued)

FOREIGN PATENT DOCUMENTS

CN        102923167 A    2/2013
CN        104260758 A    1/2015
(Continued)

OTHER PUBLICATIONS

TSSM; Based Modeling and Verification of VBTC MA Unit in VOBC—English Translation Abstracts pp. 7-8 Attached Keywords: VBTC; MA; TSSM; Moving Block based on Relative Velocity Classno: U284.91.
(Continued)

Primary Examiner — Kevin R Steckbauer
(74) Attorney, Agent, or Firm — Aasheesh V. Shravah; CM Law

(57) ABSTRACT

Provided is a relative velocity train protection method and apparatus. The method includes the following steps: a preceding train and a following train in two successive trains calculate their safe spatial-temporal trajectory information in a stopping process using an electronic map, velocity measurement and positioning information, and performance of the train (S11); the following train obtains the spatial-temporal trajectory information of the preceding train through vehicle-to-vehicle communication (S12); the following train creates a safety condition according to a constraint that a position of the following train does not surpass that of the preceding train at any time, and solves the emergency brake intervention (EBI) velocity of the follow-
(Continued)

(1) Hard wall collision model, considering that the preceding train stops instantaneously (the position remains unchanged)

(2) Soft wall collision model, considering that the velocity of the preceding train changes continuously (the position is variable)

ing train (S13); the following train determines whether its measured velocity $v_2(t_0)$ exceeds the EBI velocity $E_2(t_0)$, and if so, make the following train decelerate until the following train stops (S14).

8 Claims, 9 Drawing Sheets

(51) Int. Cl.
    *B61L 21/10*      (2006.01)
    *B61L 23/18*      (2006.01)
    *B61L 27/40*      (2022.01)
    *H04W 4/46*      (2018.01)

(52) U.S. Cl.
    CPC .............. *B61L 23/18* (2013.01); *B61L 27/40* (2022.01); *H04W 4/46* (2018.02)

(56) References Cited

U.S. PATENT DOCUMENTS

| | | | |
|---|---|---|---|
| 9,566,959 B2* | 2/2017 | Breuer | B60R 21/0134 |
| 9,840,261 B2* | 12/2017 | Di Cairano | B60T 13/665 |
| 10,259,478 B1* | 4/2019 | Gao | B61L 27/20 |
| 10,960,909 B2* | 3/2021 | Gao | B61L 21/10 |
| 11,097,756 B2* | 8/2021 | Kubo | B61L 27/20 |
| 11,267,497 B2* | 3/2022 | Zhuo | B61L 25/021 |
| 11,390,306 B1* | 7/2022 | Yang | G06N 20/00 |
| 11,400,905 B2* | 8/2022 | Yamada | B60T 17/228 |
| 11,926,356 B1* | 3/2024 | Wang | B61L 21/10 |
| 12,024,212 B2* | 7/2024 | Xia | B61L 15/0027 |
| 12,049,245 B2* | 7/2024 | Yu | B61L 27/70 |
| 12,195,065 B2* | 1/2025 | Pan | B61L 27/40 |
| 2007/0142984 A1* | 6/2007 | Plawecki | B61L 15/0062 701/2 |
| 2008/0128562 A1* | 6/2008 | Kumar | B61L 15/0081 246/186 |
| 2008/0161984 A1* | 7/2008 | Hrdlicka | B61L 15/0058 701/19 |
| 2010/0241296 A1* | 9/2010 | Rhea, Jr. | B61L 15/0062 701/20 |
| 2012/0072088 A1* | 3/2012 | Cutright | B60T 13/665 701/70 |
| 2014/0180573 A1* | 6/2014 | Rhea | B60T 17/228 701/411 |
| 2015/0012204 A1* | 1/2015 | Breuer | B60R 21/0134 701/96 |
| 2016/0280242 A1* | 9/2016 | Di Cairano | B60T 7/18 |
| 2019/0106136 A1* | 4/2019 | Nishinaga | B61L 27/20 |
| 2019/0111953 A1* | 4/2019 | Gao | B61L 3/08 |
| 2019/0135311 A1* | 5/2019 | Zarella | B61L 15/0072 |
| 2019/0144025 A1* | 5/2019 | Gao | B61L 27/40 701/19 |
| 2019/0168790 A1* | 6/2019 | Kubo | B61L 21/10 |
| 2020/0039489 A1* | 2/2020 | Yamada | B60L 15/40 |
| 2020/0122759 A1* | 4/2020 | Zhuo | B61L 27/20 |
| 2021/0354566 A1* | 11/2021 | Ben-Ari | B60T 1/10 |
| 2022/0055672 A1* | 2/2022 | Yu | B61L 27/16 |
| 2022/0277237 A1* | 9/2022 | Su | G06Q 10/06312 |
| 2022/0388555 A1* | 12/2022 | Zhang | B61L 23/041 |
| 2023/0303139 A1* | 9/2023 | Pan | B61L 27/20 |
| 2023/0311959 A1* | 10/2023 | Chai | B61L 23/34 701/19 |
| 2024/0092407 A1* | 3/2024 | Wang | B61L 27/20 |
| 2024/0239389 A1* | 7/2024 | Hongjie | H04W 4/46 |

FOREIGN PATENT DOCUMENTS

| | | | | |
|---|---|---|---|---|
| CN | 105346563 A | * | 2/2016 | ............ B61L 23/00 |
| CN | 105346563 B | * | 3/2017 | ............ B61L 23/00 |
| CN | 108238069 A | | 7/2018 | |
| CN | 109080667 A | * | 12/2018 | ............ B61L 23/00 |
| CN | 110588723 A | | 12/2019 | |
| CN | 110696876 A | | 1/2020 | |
| CN | 107548368 B | * | 10/2020 | ............ B61L 3/008 |
| CN | 111845862 A | * | 10/2020 | ............ B61L 23/18 |
| CN | 114604295 A | * | 6/2022 | ......... B61L 15/0036 |
| EP | 3483030 A1 | * | 5/2019 | ............ B61L 21/10 |
| JP | 2001333511 A | | 11/2001 | |
| JP | 3452703 B2 | * | 9/2003 | |
| JP | 7466494 B2 | * | 4/2024 | |
| WO | WO-2011135626 A1 | * | 11/2011 | ............ B60L 15/20 |
| WO | WO-2018121583 A1 | * | 7/2018 | ............ B61L 23/18 |
| WO | WO-2018155558 A1 | * | 8/2018 | ............ B60L 15/40 |
| WO | WO-2022012166 A1 | * | 1/2022 | ............ B61L 23/18 |

OTHER PUBLICATIONS

Qianying He, QH., "TSSM; Based Modeling and Verification of VBTC MA Unit in VOBC", Journal Chinese Master's Theses Full-text Database Engineering Science and Technology "2017", 97pgs, "English Translation of Abstracts included pp. 7-8 Attached".

\* cited by examiner

RELATIVE VELOCITY BASED TRAIN PROTECTION METHOD AND APPARATUS

CROSS REFERENCE TO RELATED APPLICATION

This patent application claims the benefit and priority of Chinese Patent Application No. 202010674429.4, filed with the China National Intellectual Property Administration on Jul. 14, 2020, the disclosure of which is incorporated by reference herein in its entirety as part of the present application.

TECHNICAL FIELD

The present disclosure relates to the field of transportation, and in particular, to a relative velocity based train protection method and apparatus.

BACKGROUND

With the rapid development of China's national economy and urbanization construction, rail transit is facing the demand of transporting more passengers and goods, which has become an important means to relieve the traffic pressure. As the "brain and nerve center" of rail transit, the train running control system aims to ensure the efficient running of trains while providing safety.

In the current train control system based on moving block, there are theoretically two ways to protect trains from over-speeding: "hard wall collision" (considering that the preceding train stops instantaneously) and "soft wall collision" (considering the relative velocity between a preceding train and a following train in two successive trains). In the "hard wall collision" model, the endpoint of the movement authority (MA) of the following train (a position point that the following train is absolutely not allowed to cross) is set to the rear position of the preceding train (it can also be considered to reserve a protection distance). The automatic train protection (ATP) system protects train running within MA limits, ensuring that the train does not exceed the limit of the MA endpoint. In the "hard wall collision" model, the train interval is controlled based on the absolute braking distance of following train, that is, $d=d_{brake2}+S$, where d is the safe tracking interval distance between two trains, $d_{brake2}$ is the braking distance of the following train, and S is the safe distance margin. Therefore, there is no possibility that the running trajectories of the two trains cross from the time when the following train receives the MA taking the tail of the preceding train as the endpoint. The following train only needs to calculate the velocity-distance curve according to the MA and protect the actual running velocity of the train accordingly, so as to ensure that the following train does not overspeed. Thus, it can be ensured that the following train does not exceed the limit of the MA endpoint, so as to ensure the safety of train tracking running (no rear-end collision). However, in this method, the tracking interval distance of trains is relatively large, which limits the line transport capacity and is difficult to meet the continuous and rapid growth of passenger flow demand.

Compared with the "hard wall collision" method, the "soft wall collision" method uses the velocity and braking process information of the preceding train, so as to shorten the train tracking interval and improve the tracking efficiency. When the preceding train has a certain velocity, the MA endpoint of the following train is no longer set as the rear of the preceding train (considering a certain safe distance margin). Instead, based on the estimated forward running distance of the preceding train, the protection point of the following train can be set to a position before the rear position of the preceding train at the current time (represented by p herein), so as to shorten the train tracking interval. In the existing literature, the position of the preceding train at the stopping time is usually estimated as the above position p, and this position is taken as the MA endpoint of the following train. Accordingly, the maximum position limit that the following train can reach at the stopping time can be obtained (the head position of the following train cannot cross the rear position of the preceding train, and a certain protection distance margin is considered). Further, combined with the braking distance of the following train in the stopping process, the minimum safe tracking interval between the following train and the preceding train can be calculated, that is, $d=d_{brake2}-d_{brake1}+S$, where $d_{brake1}$ is the braking distance of the preceding train, d is the safe tracking interval distance between the two trains, $d_{brake2}$ is the braking distance of the following train, and S is the safe distance margin. The above formula specifies the minimum interval between the preceding and following trains under the premise of safety when the velocities of the two trains are determined. In practice, according to the distance of the preceding train and the following train in two successive trains and the velocity of the preceding train, combined with the line parameters and the safe braking models of the two trains (including the train braking process description and performance parameters under the most unfavorable condition), the emergency brake intervention (EBI) velocity of the following train can be calculated and the actual velocity of the train can be protected. That is, if the actual velocity of the following train exceeds the EBI velocity, emergency braking is output to decelerate the train to a stop, so as to ensure that the actual position of the following train after stopping does not exceed the limit of the above target position. Obviously, the "soft wall collision" model can effectively shorten the minimum safe tracking interval distance between the trains.

However, the above "soft wall collision" method only considers the position relationship between the two trains at the stopping time, and does not consider the safety requirements of the whole spatial-temporal position relationship during the train running. As a result, there are potential safety risks of rear-end collision when the performance parameters and initial velocities of the preceding and following trains are different. The comparison of the "hard wall collision" and "soft wall collision" models and the hidden dangers of the above methods are shown in FIG. 1. The following is a detailed description of scenarios where the "soft wall collision" method has potential security risks.

According to the formula for calculating the safe train tracking interval in the "soft wall collision" method (that is, $d=d_{brake2}-d_{brake1}+S$), if $d_{brake2}<d_{brake1}$, the train tracking interval obtained by this method may be less than the minimum safe distance margin, or even less than 0 (that is, d<0), resulting in potential safety risks. Further analysis shows that when the initial velocity of the preceding train is low but the braking acceleration is small (slow deceleration), and the initial velocity of the following train is high but the braking acceleration is large (fast deceleration), the distance between the two trains first decreases and then increases. Therefore, the change of the distance between the two trains is non-monotonous, and the minimum distance between the two trains does not necessarily occur at the stopping time. Therefore, the existing "soft wall collision" method only considers the constraint that two trains do not collide at the stopping time, which is not enough to ensure the safety of the whole process of train tracking.

SUMMARY

An embodiment of the present disclosure provides a relative velocity based train protection method and apparatus, which considers a safety constraint of spatial-temporal trajectories of preceding and following trains in a whole process of train tracking, and can ensure safety of the whole process of tracking under any performance combination conditions of the preceding and following trains and avoid rear-end collision.

A relative velocity based train protection method includes the following steps:

step 1, calculating safe spatial-temporal trajectory information of a preceding train and a following train in two successive trains in a stopping process using an electronic map and autonomous velocity measurement and positioning information in combination with performance of the trains, where the safe spatial-temporal trajectory information includes: a curve of a position changing with time;

step 2, obtaining the safe spatial-temporal trajectory information of the preceding train by the following train through vehicle-to-vehicle communication;

step 3, creating a safety condition by the following train according to a constraint that a position of the following train does not surpass a position of the preceding train at any time in combination with the safe spatial-temporal trajectory information of the preceding train and the following train, and solving an EBI velocity of the following train; and step 4, determining, by the following train through comparison, whether a current measured velocity $v_2(t_0)$ of the following train exceeds the EBI velocity $E_2(t_0)$ of the following train, and if $v_2(t_0) > E_2(t_0)$, outputting an emergency braking instruction to make the following train decelerate until the following train stops.

A relative velocity based train protection apparatus includes:

a first generation unit configured to calculate safe spatial-temporal trajectory information of a preceding train and a following train in two successive trains in a stopping process using an electronic map and autonomous velocity measurement and positioning information in combination with performance of the trains, where the safe spatial-temporal trajectory information includes: a curve of a position changing with time;

an obtaining unit configured to obtain the safe spatial-temporal trajectory information of the preceding train by the following train through vehicle-to-vehicle communication;

a solving unit configured to create a safety condition by the following train according to a constraint that a position of the following train does not surpass a position of the preceding train at any time in combination with the safe spatial-temporal trajectory information of the preceding train and the following train, and solve an EBI velocity of the following train; and a comparison unit configured to determine, by the following train through comparison, whether a current measured velocity $v_2(t_0)$ of the following train exceeds the EBI velocity $E_2(t_0)$ of the following train, and output an emergency braking instruction to make the following train decelerate until the following train stops if $v_2(t_0) > E_2(t_0)$.

As can be seen from the technical solution provided by the embodiment of the present disclosure, in the embodiment of the present disclosure, relative velocity based train protection can be realized and rear-end collision can be avoided by adopting the vehicle-vehicle communication system and overspeed protection design method.

The additional aspects and advantages of the present disclosure will be partially given in the following description, and become clear in the following description, or be learned through the practice of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are only used to explain the present disclosure but should not be construed as a limitation to the present disclosure.

Those skilled in the art can understand that, unless otherwise stated, the singular forms "a", "an", "said" and "the" used herein may also include plural forms. It should be further understood that the word "comprising" used in the specification of the present disclosure refers to the presence of the described features, integers, steps, operations, elements and/or components, but does not exclude the presence or addition of one or more other features, integers, steps, operations, elements, components, and/or groups thereof. It should be understood that when an element is "connected" or "coupled" to another element, it can be connected or coupled to the another element directly or through an intermediate element. In addition, "connection" or "coupling" used herein may include wireless connection or coupling. The term "and/or" used herein includes any unit and all combinations of one or more of the associated listed items.

Those skilled in the art can understand that, unless otherwise defined, all terms (including technical terms and scientific terms) used herein have the same meanings as those commonly understood by those of ordinary skill in the art to which the present disclosure belongs. It should also be understood that terms such as those defined in general dictionaries should be understood as having meanings consistent with the meanings in the context of the prior art, and unless otherwise defined herein, these terms will not be explained in ideal or overly-formal meanings.

For ease of understanding of the embodiments of the present disclosure, several specific embodiments will be taken as examples for further explanation and description in conjunction with the accompanying drawings, and each embodiment does not constitute a limitation to the embodiments of the present disclosure.

Figure 1:
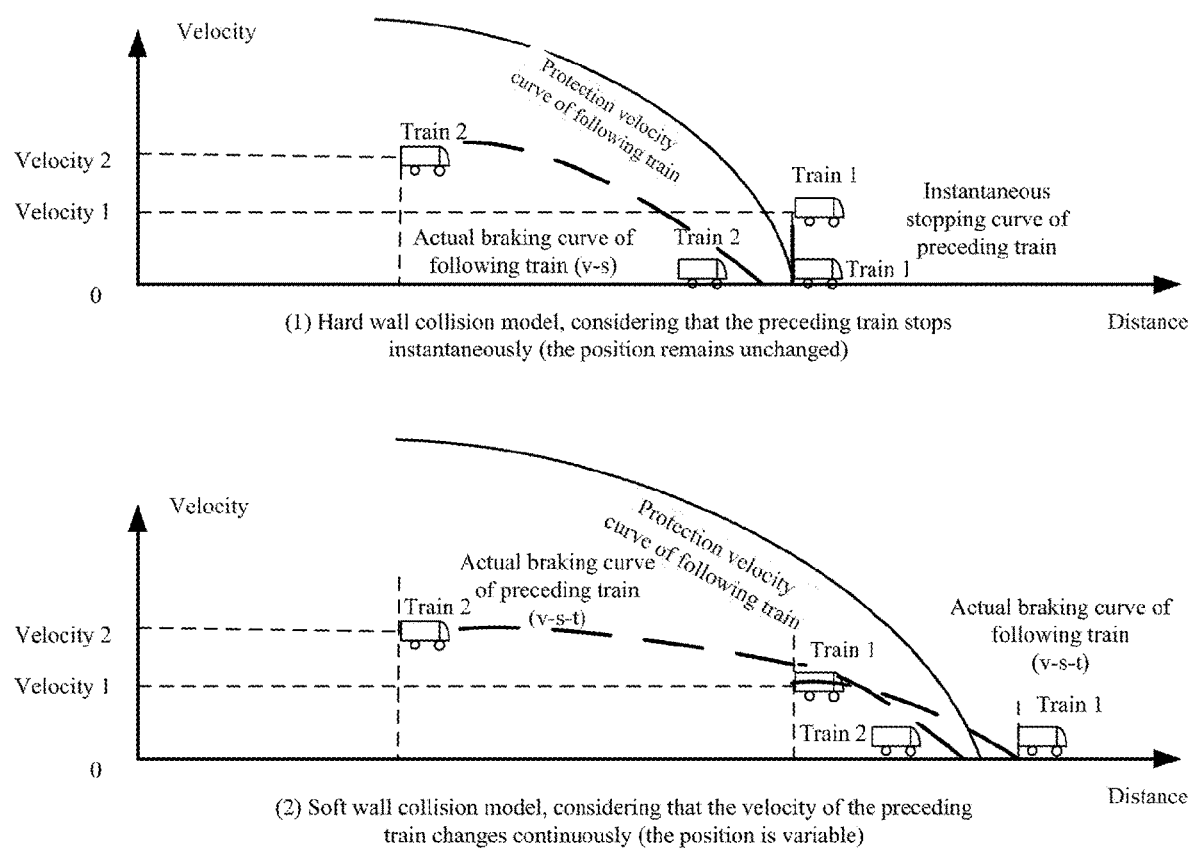
FIG. 1 is a comparison diagram of "hard wall collision" and "soft wall collision" models.
Figure 2:
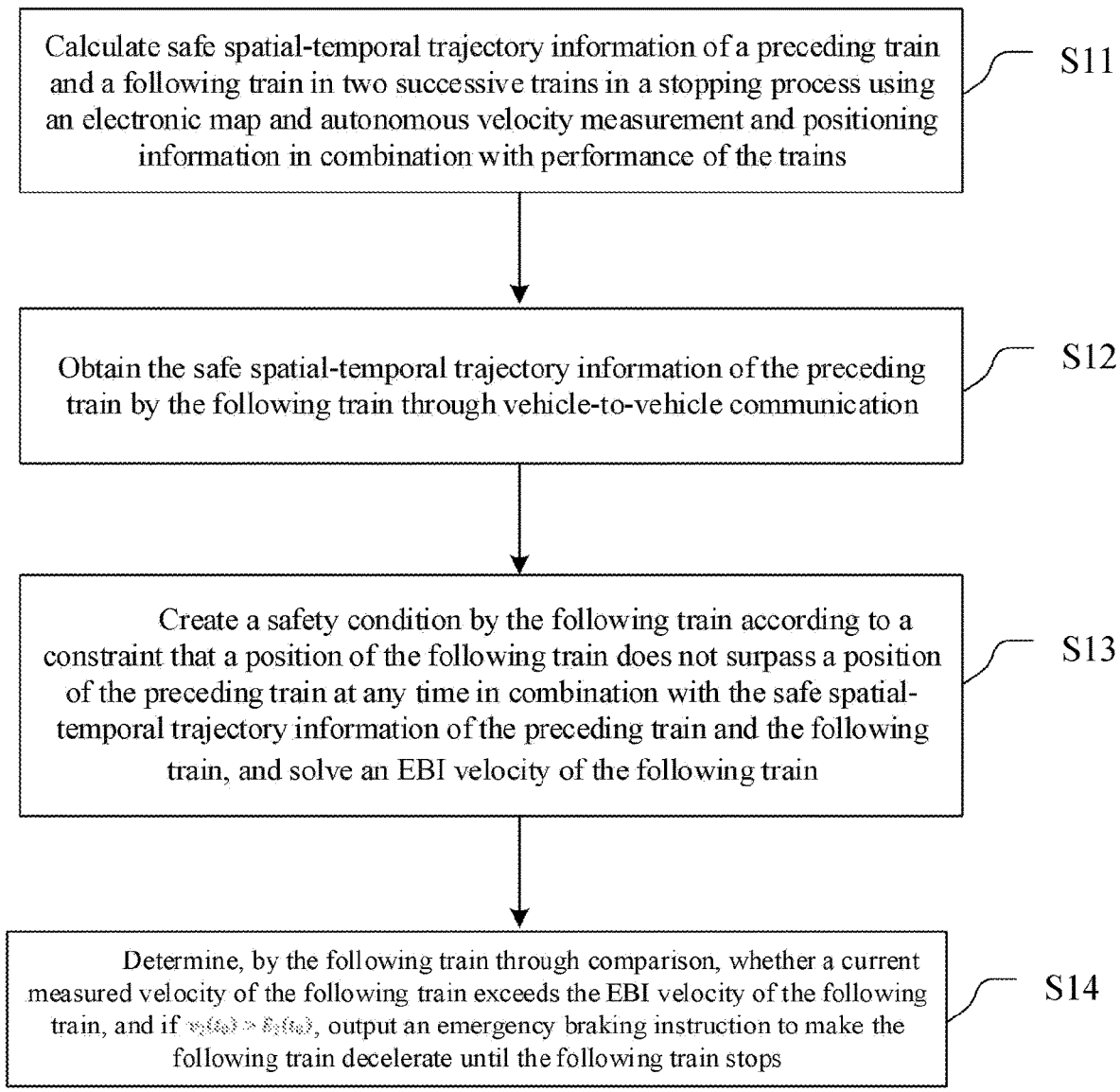
FIG. 2 is a flow diagram of a relative velocity based train protection method of the present disclosure.

A process flow of a relative velocity based train protection method provided by an embodiment of the present disclosure is shown in FIG. 2, and the method includes the following process steps.

Step 11, Safe spatial-temporal trajectory information of a preceding train and a following train in two successive trains in a stopping process is calculated using an electronic map and autonomous velocity measurement and positioning information in combination with performance of the trains. The safe spatial-temporal trajectory information includes: a curve of a position changing with time;

Step 12, The safe spatial-temporal trajectory information of the preceding train is obtained by the following train through vehicle-to-vehicle communication.

Step 13, A safety condition is created by the following train according to a constraint that a position of the following train does not surpass a position of the preceding train at any time in combination with the safe spatial-temporal trajectory information of the preceding train and the following train, and an EBI velocity of the following train is solved.

Step 14, Whether a current measured velocity $v_2(t_0)$ of the following train exceeds the EBI velocity $E_2(t_0)$ of the following train is determined by the following train through comparison, and if $v_2(t_0) > E_2(t_0)$, an emergency braking instruction is output to make the following train decelerate until the following train stops.

Step 11 specifically includes the following sub-steps.

The preceding train obtains own velocity $v_1(t_0)$ and position information $x_1(t_0)$ using the velocity measurement and positioning technology, and the following train obtains own velocity $v_2(t_0)$ and position information $x_2(t_0)$.

The preceding train obtains most unfavorable slope acceleration $\beta_1$ during emergency braking and maximum emergency braking acceleration $\alpha_1$. The following train obtains most unfavorable slope acceleration $\beta_2$ from triggering of emergency braking to stopping, a duration of traction phase $\delta_2$, maximum traction acceleration $\gamma_2$, a duration of idling phase $\varepsilon_2$, and emergency braking acceleration $\alpha_2$ that is guaranteed under a most unfavorable condition.

The preceding train takes measured rear position and velocity information as an initial state, and calculates the curve of the position of the train changing with time during braking according to a model of a train immediately implementing emergency braking in combination with train braking performance and line parameters obtained by query.

The following train takes measured train head position information and EBI velocity as an initial state, and calculates the curve of the position of the train changing with time during braking according to a safe braking model stipulated in IEEE1474.1 in combination with train traction and braking performance and line parameters obtained by query.

Step 13 specifically includes the following sub-steps.

Step 131, A duration of braking phase $\tau_1$ of the preceding train is calculated, namely, $$\tau_1 = -\frac{v_1(t_0)}{\alpha_1 + \beta_1}.$$

Step 132, According to the duration of braking phase $\tau_1$ of the preceding train, a duration of traction phase $\delta_2$ of the following train, a duration of idling phase $\varepsilon_2$ of the following train, the maximum emergency braking acceleration $\alpha_1$, the most unfavorable slope acceleration $\beta_1$ of the preceding train during emergency braking, the emergency braking acceleration $\alpha_2$ that is guaranteed under the most unfavorable condition of the following train, and the most unfavorable slope acceleration $\beta_2$ of the following train from triggering of the emergency braking to stopping, a calculation method for the EBI velocity of the following train is determined.

If $\tau_1 < \delta_2 + \varepsilon_2$, a constraint of an initial velocity of the following train is calculated, that is, if $v_2(t_0) \leq f_5(t)$ and $v_2(t_0) \leq f_4(t_{m1})$, the EBI velocity of the following train is calculated as follows: $E_2(t_0) = \min(f_5(t), f_4(t_{m1}))$.

If $\delta_2 + \varepsilon_2 \leq \tau_1$ and $(\alpha_1 + \beta_1) - (\alpha_2 + \beta_2) > 0$, a constraint of an initial velocity of the following train is calculated, that is, if $v_2(t_0) \leq f_5(t)$, $v_2(t_0) \leq f_4(t_{m1})$, $v_2(t_0) \leq f_4(t_1)$ and $v_2(t_0) \leq f_3(t_{n1})$, the EBI velocity of the following train is calculated as follows: $E_2(t_0) = \min(f_5(t), f_4(t_{m1}), f_4(t_1), f_3(t_{n1}))$.

If $\delta_2 + \varepsilon_2 \leq \tau_1$ and $(\alpha_1 + \beta_1) - (\alpha_2 + \beta_2) \leq 0$, a constraint of an initial velocity of the following train is calculated, that is, if $v_2(t_0) \leq f_5(t)$, $v_2(t_0) \leq f_4(t_{m1})$ and $v_2(t_0) \leq f_4(t_1)$ the EBI velocity of the following train is calculated as follows:

$$E_2(t_0) = \min(f_5(t), f_4(t_{m1}), f_4(t_1), f_3(t_{m1})).$$

The following describes an application scenario of the present disclosure.

The present disclosure provides a relative velocity based train protection method, which not only guarantees the whole spatial-temporal safety of in the tracking process of two trains (no rear-end collision), but also fully considers the actual state and braking distance of the preceding train. Thus, the train tracking interval is shortened, the transportation efficiency of the rail transit system is improved, the development of the safe protection technology of the urban rail train system is promoted, the safety of train in the whole spatial-temporal range is ensured, and rear-end collision is avoided. Based on the vehicle-to-train control system, the present disclosure realizes high-density safe tracking of trains by clarifying the information content transmitted during vehicle-to-train communication and the specific use of information. The method for overspeed protection of the following train based on the relative velocity between a preceding train and a following train in two successive trains can be applied to the signal safety protection technology of rail transit.

The preceding train and the following train in two successive trains with vehicle-vehicle communication can realize autonomous velocity measurement and positioning, and establish end-to-end communication links between adjacent trains (the specific communication system is not limited, which can adopt point-to-point direct vehicle-vehicle communication, or WLAN, LTE or 5G communication channel). The vehicle on-board controller (VOBC) of the train stores the electronic map of the line data, and can query various required line parameter information (such as the slope acceleration of the line). In order to achieve high-density safe train tracking, the process design for the interaction and use of information of the preceding train and the following train in two successive trains is as follows.

The contents transmitted between adjacent trains shall include train ID, train position, train velocity, and the spatial-temporal trajectory of the train under the "most favorable" condition. The spatial-temporal trajectory of the train under the "most favorable" condition refers to the position-time function curve formed by the train running in accordance with the fastest braking stop mode under the conditions of the current position, velocity, train performance parameters and line parameters.

According to the relevant parameters of the train control factors that can make the train stop the fastest, the spatial-temporal trajectory of the train under the "most favorable" condition is calculated for the preceding train according to the maximum emergency braking model that has been implemented. The maximum emergency acceleration of the train is taken according to the maximum emergency braking value in the train performance parameters provided by the vehicle system. The line slope acceleration during braking is taken according to the slope acceleration of the maximum upslope that the train may be on during braking (that is, the acceleration that makes the train stop faster). When there is no upslope but there is a flat slope, the line slope acceleration is taken according to the flat slope. Otherwise, the minimum value in all downslopes is taken. For the convenience of description, it is collectively referred to as "maximum upslope" herein.

The preceding train sends the spatial-temporal trajectory under the "most favorable" condition generated by the calculation to the following train together with the train ID, position, and velocity.

After receiving the information of the preceding train, the following train regards it as the protection target curve that cannot be crossed in the running process.

In accordance with the train braking model stipulated in IEEE1474.1 standard, the spatial-temporal trajectory curve of the following train under the "most unfavorable" condition is calculated, that is, the running process curve of the train with the slowest stop under the condition of immediate output of emergency braking. When the spatial-temporal trajectory curve of the following train under the "most unfavorable" condition is calculated, the braking acceleration of the train is taken according to the "most unfavorable" emergency braking acceleration, and the line slope acceleration during braking is taken according to the maximum downslope acceleration.

The following train compare the spatial-temporal trajectory curve of its own under the "most unfavorable" condition with that of the preceding train under the "most favorable" condition to ensure that the position value of the preceding train at any time (i.e. the maximum front end position of the following train) does not exceed the position value of the following train at the corresponding time (i.e. the maximum safe rear end of the preceding train), so as to ensure the safety of train tracking running. Since the spatial-temporal trajectory curve of the following train under the "most favorable" condition is related to its "initial velocity", the calculated maximum "initial velocity" of the following train under the premise of ensuring the above safety is the calculated safe protection velocity of the following train (also known as the EBI velocity).

The following train compares its own actual velocity with the calculated EBI velocity. When the actual velocity exceeds the EBI velocity, the emergency braking is output to stop the train, so as to ensure that no rear-end collision occurs in the process of train tracking.

In the actual multi-train tracking process, any train in the middle can be used as the preceding train of its following train or the following train of its preceding train, which can simultaneously complete the functions of the preceding train and the following train, so as to realize the high-density safe tracking running of trains.

In addition to the specific content and processing principle of vehicle-vehicle communication, the core content of the present disclosure is the running process model of the preceding train and the following train and the calculation method for the EBI velocity of the following train for the whole spatial-temporal collision avoidance provided on this basis.

The mathematical model of running process of the preceding train and the following train and the specific calculation method for the EBI velocity of the train are described below.

1. Safe Train Tracking Process Analysis and Modeling

According to the practical experience of train protection system design, when the preceding train adopts maximum emergency braking for stopping and the following train adopts the safe braking model stipulated in IEEE 1474.1 standard for running, it corresponds to the safety boundary conditions of the two trains in the tracking running. Therefore, two-train safe tracking models are established based on these conditions.

1) Two-Train Tracking Process Model

According to the above safety boundary conditions, the running process of the preceding train is uniformly accelerated linear motion, and the running process of the following train is piecewise uniformly accelerated linear motion. For all trains below, 1 represents the preceding train and 2 represents the following train. The following takes running in the positive direction of the train line (the position of the train increases continuously in the running direction) as an example for illustration (running in the opposite direction of the line is similar). The running process of the preceding train can be described by the following formula:

$$a_1(t) = \begin{cases} \alpha_1 + \beta_1 t_0 \leq t < t_1 \\ 0 \quad t_1 \leq t \leq t_b \end{cases}, \quad (1)$$

where $a_1(t)$ is the acceleration of the preceding train at any time, $\alpha_1$ is the maximum emergency braking acceleration (constant) of the preceding train (train 1), $\beta_1$ is the most unfavorable slope (upslope) acceleration (constant) of the preceding train during emergency braking, $t_b$ is the time when both trains stop, and $t_1$ is the stopping time of the preceding train, satisfying $t_1 = t_0 + \tau_1$ (where $\tau_1$ is the braking duration of the preceding train, satisfying $$\tau_1 = \frac{v_1(t_0)}{\alpha_1 + \beta_1}\bigg).$$

On this basis, the velocity and rear position of the preceding train at any time can be obtained, as shown in Formula (2) and Formula (3):

$$v_1(t) = \begin{cases} v_1(t_0) + (\alpha_1 + \beta_1)(t - t_0) t_0 \leq t < t_1 \\ 0 \quad t_1 \leq t \leq t_b \end{cases}, \text{ and} \quad (2)$$

-continued $$x_1(t) = \begin{cases} x_1(t_0) + v_1(t_0)(t-t_0) + \frac{1}{2}(\alpha_1 + \beta_1)(t-t_0)^2 t_0 \le t < t_1 \\ x_1(t_0) + \frac{[v_1(t_0)]^2}{2(\alpha_1 + \beta_1)} t_1 \le t \le t_b \end{cases} \quad (3)$$

According to the safe train braking model, the following train goes through three phases: traction, idling (without traction and braking acceleration, but may be in an accelerating state due to slope acceleration) and emergency braking. The acceleration of the following train at any time is shown in Formula (4):

$$a_2(t) = \begin{cases} \gamma_2 + \beta_0 t_0 \le t < b_2 \\ \beta_2 b_2 \le t < c_2 \\ \alpha_2 + \beta_2 c_2 \le t < t_2 \\ 0 \quad t_2 \le t < t_b \end{cases} \quad (4)$$

where $\alpha_2(t)$ is the acceleration of the following train at any time, $\gamma_2$ is the maximum traction acceleration (constant) of the following train when the emergency braking is triggered, $\beta_2$ is the most unfavorable slope (downslope) acceleration (constant) of the following vehicle from triggering of emergency braking to stopping, $\alpha_2$ is the emergency braking acceleration (constant) of the following train that can be guaranteed under the most unfavorable condition on the flat track, $b_2$ is the time when the traction phase of the following train ends (that is, the time when the idling phase begins), $c_2$ is the time when the idling phase of the following train ends (that is, the time when the emergency braking begins), and $t_2$ is the time when the rear car stops with emergency braking.

The velocity of the following train at any time can be obtained, as shown in Formula (5):

$$v_2(t) = \begin{cases} v_2(t_0) + (\gamma_2 + \beta_2)(t-t_0)t_0 \le t < b_2 \\ v_2(b_2) + \beta_2(t-b_2)b_2 \le t < c_2 \\ v_2(c_2) + (\alpha_2 + \beta_2)(t-c_2)c_2 \le t < t_2 \\ 0 t_2 \le t \le t_b \end{cases} \quad (5)$$

where $v_2(t_2^a)$ is the velocity of the following train at the end of traction $t_2^a$, satisfying:

$$v_2(t_2^a) = v_2(t_0) + (\gamma_2 + \beta_2)\delta_2, \quad (6)$$

where $\delta_2$ is the duration of traction phase of the following train, satisfying $\delta_2 = b_2 - t_0$, and $v_2(c_2)$ is the velocity of the following train at the end of idling $c_2$, satisfying:

$$v_2(c_2) = v_2(b_2) + \beta_2 \varepsilon_2, \quad (7)$$

where $\varepsilon_2$ is the duration of idling phase of the following train, satisfying: $\varepsilon_2 = c_2 - b_2$.

Further, the head position of the following train at any time can be obtained, as shown in Formula (8):

$$x_2(t) = \begin{cases} x_2(t_0) + v_2(t_0)(t-t_0) + \frac{1}{2}(\gamma_2 + \beta_2)(t-t_0)^2 t_0 \le t < b_2 \\ x_2(b_2) + v_2(b_2)(t-b_2) + \frac{1}{2}\beta_2(t-b_2)^2 b_2 \le t < c_2 \\ x_2(c_2) + v_2(c_2)(t-c_2) + \frac{1}{2}(\alpha_2 + \beta_2)(t-c_2)^2 c_2 \le t < t_2 \\ x_2(t_2^c) - \frac{[v_2(c_2)]^2}{2(\alpha_2 + \beta_2)} t_2 \le t \le t_b \end{cases} \quad (8)$$

where $x_2(b_2)$ is the position of the following train at the end of traction $b_2$, satisfying:

$$x_2(b_2) = x_2(t_0) + v_2(t_0)\delta_2 + \frac{1}{2}(\gamma_2 + \beta_2)(\delta_2)^2, \quad (9)$$

where $x_2(c_2)$ is the position of the following train at the end of idling $c_2$, satisfying:

$$x_2(c_2) = x_2(b_2) + v_2(c_2)\varepsilon_2 + \frac{1}{2}\beta_2(\varepsilon_2)^2. \quad (10)$$

2) Safety Condition Constraints of Train Tracking Running

According to the basic assumption that the position of the train increases continuously in the direction of train running, and the basic knowledge of safe train tracking running, the safety conditions to ensure that the train does not have rear-end collision can be described as follows:

$$x_2(t) \le x_1(t) - S, t \in [t_0, t_b], \quad (11)$$

where S is the protection distance margin (constant). The above formula indicates that the distance between the head position of the following train and the rear position of the preceding train at any time shall not be less than the protection distance margin, so as to ensure the safety of train tracking. It should be noted that according to the need of the minimum tracking interval, the minimum distance between two trains during running shall be minimized (that is, the train tracking efficiency is the highest when the minimum distance between two trains is exactly equal to S).

3) Calculation Method for EBI Velocity of Following Train

The EBI curve of the following train shall be the maximum velocity calculated according to the state of the preceding and following trains to ensure the safe running of the following train. Therefore, the EBI curve of the following train shall be solved according to the following ideas.

A. First, the interval distance between trains at any time is defined as $d(t) = x_1(t) - x_2(t)$.

B. $d(t) \ge S$ is obtained according to the constraint that the interval distance between trains shall be greater than the specified safe protection distance during train running.

C. According to the above constraint, the inequality constraint relationship between the initial velocity $v_2(t_0)$ of the following train and $v_1(t_0)$, $x_2(t_0)$, and $x_1(t_0)$ can be calculated, assuming that it can be recorded as $v_2(t_0) \le f_n(v_1(t_0), x_2(t_0), x_1(t_0))$, where $f_n()$ means to satisfy some functional relationship. The maximum $v_2(t_0)$ obtained at this time is the EBI velocity of the train.

Figure 3A:
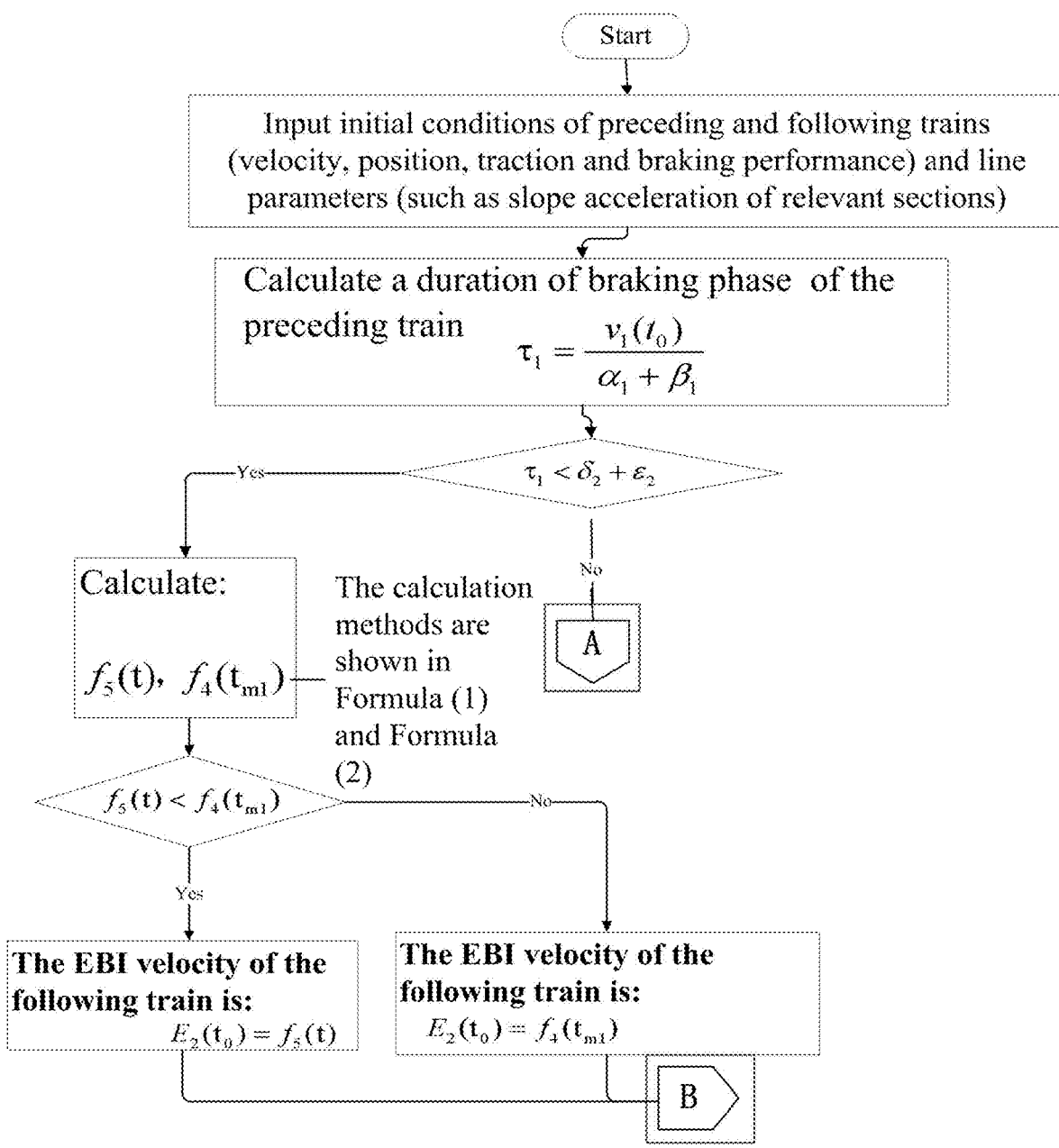
FIGS. 3A-3C show a calculation flow chart of an EBI velocity of a following train in the present disclosure.
Figure 3B:
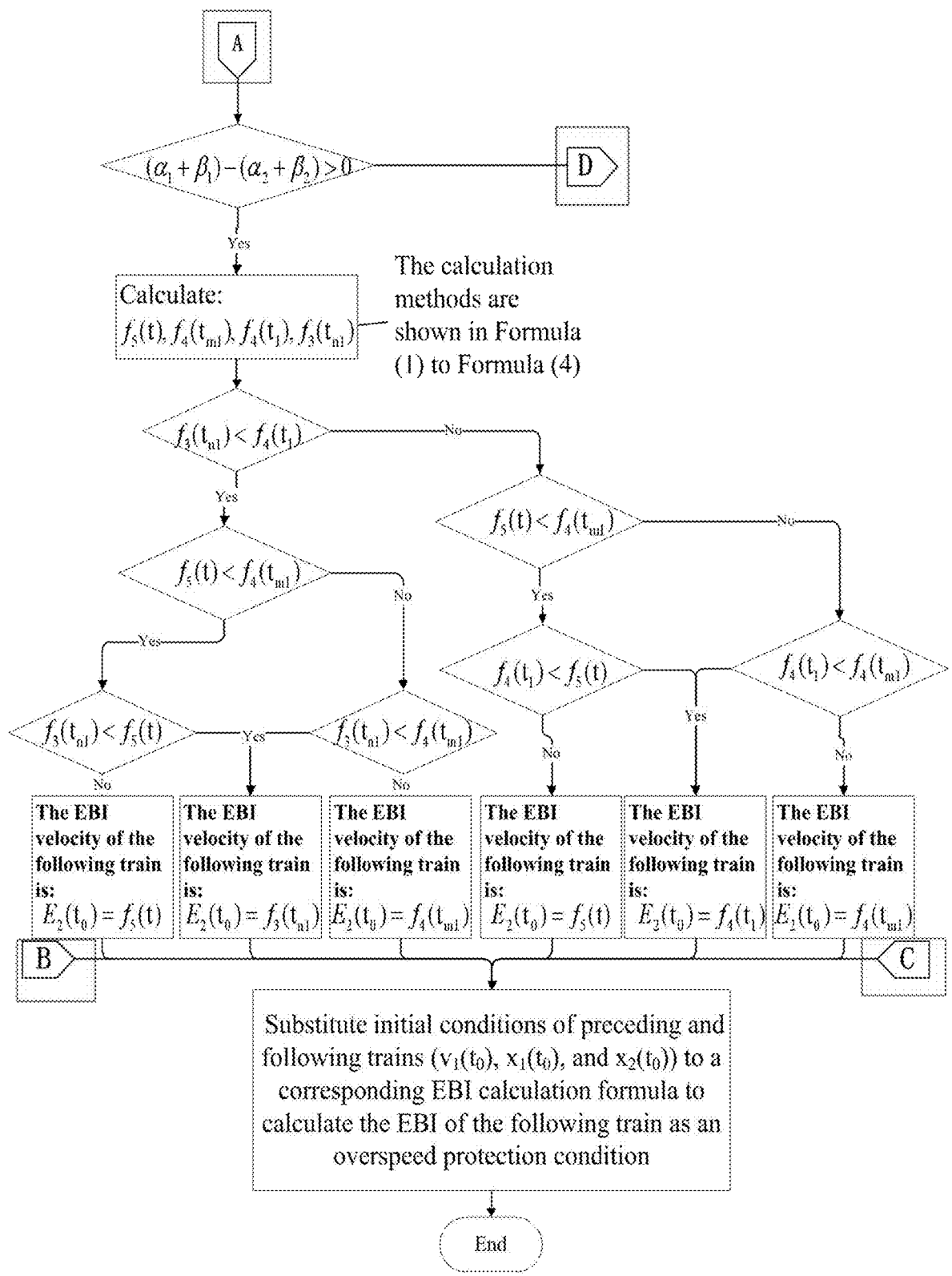
Figure 3C:
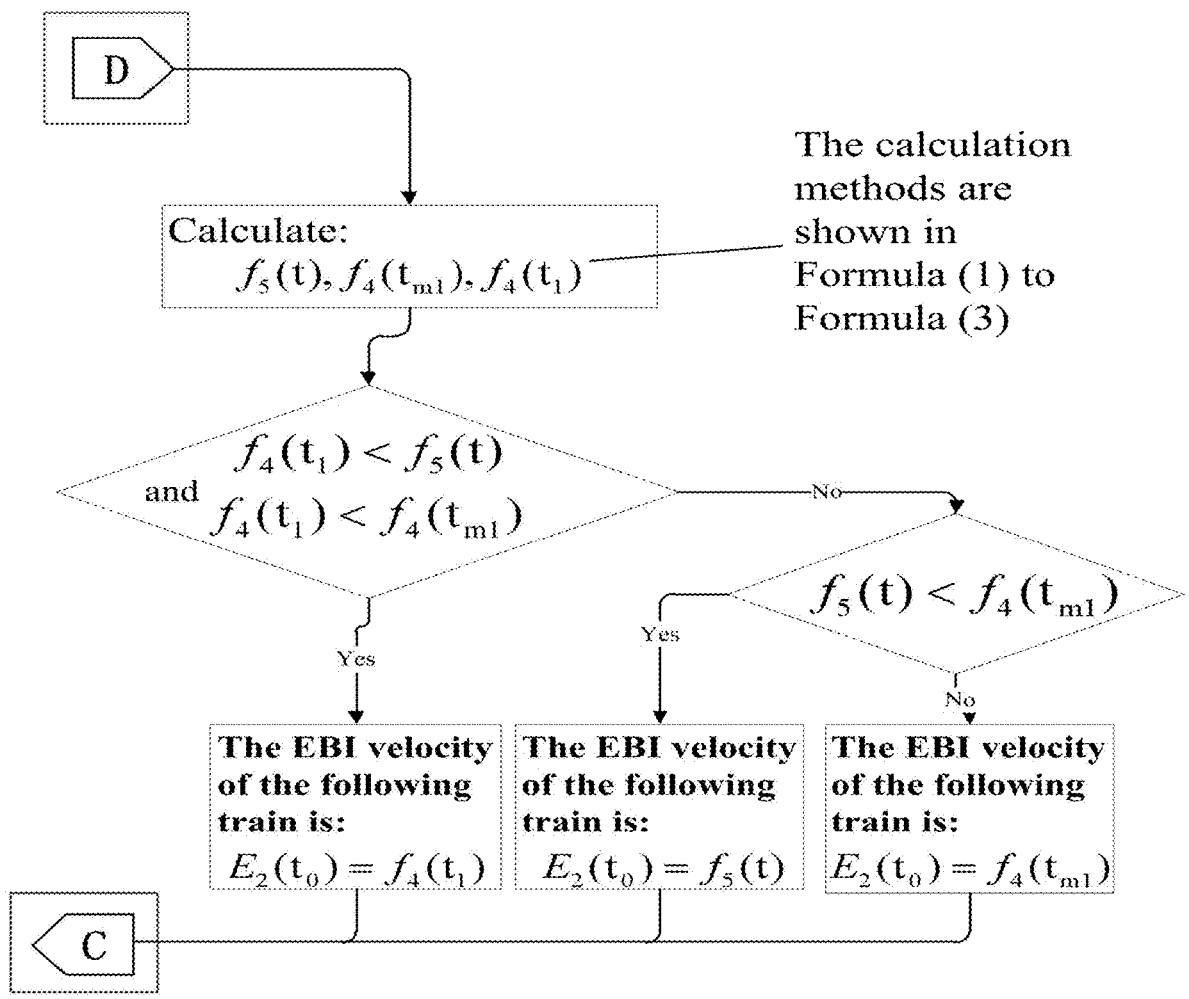

D. $f_n()$ obtained in practice is a set of a series of functions, and the minimum value of all functions should be obtained according to train classification conditions to serve as the EBI velocity of the train. The specific calculation process is shown in FIGS. 3A-3C.

Formula 1 is as follows:

$$f_5(t) = -(\alpha_2 + \beta_2)\left(B + \sqrt{B^2 - \frac{2C}{\alpha_2 + \beta_2}}\right),$$

$$\text{where } B = \frac{(\gamma_2 - \alpha_2)(\delta_2 + \varepsilon_2)}{\alpha_2 + \beta_2}, \text{ and}$$

$$C = x_1(t_0) - \frac{[v_1(t_0)]^2}{2(\alpha_1 + \beta_1)} - \left[x_2(t_0) + \frac{1}{2}(\gamma_2 + \beta_2)(\delta_2)^2 + \right.$$

$$\left. (\gamma_2 + \beta_2)\delta_2(\varepsilon_2) + \frac{1}{2}\beta_2(\varepsilon_2)^2 + \frac{[(\gamma_2 + \beta_2)\delta_2 + \beta_2\varepsilon_2]^2}{2(\alpha_2 + \beta_2)}\right] - S.$$

Formula 2 is as follows:

$$f_4(t_{m1}) = \frac{x_1(t_0) - \frac{[v_1(t_0)]^2}{2(\alpha_1 + \beta_1)} - \left[x_2(t_0) + \frac{1}{2}(\gamma_2 + \beta_2)(\delta_2)^2 + (\gamma_2 + \beta_2)\delta_2(\varepsilon_2)\right]}{t_{m1} - t_0} +$$

$$\frac{\frac{1}{2}\beta_2(\varepsilon_2)^2 + ((\gamma_2 + \beta_2)\delta_2 + \beta_2\varepsilon_2)(t_{m1} - t_2^c) + \frac{1}{2}(\alpha_2 + \beta_2)(t_{m1} - t_2^c)^2 - S}{t_{m1} - t_0},$$

$$t_{m1} = \sqrt{\frac{E}{D}} + t_0; t_2^c = \delta_2 + \varepsilon_2 + t_0; \text{ and}$$

$$D = -\frac{1}{2}(\alpha_2 + \beta_2) > 0; E = \gamma_2(\delta_2)^2 - \frac{1}{2}\alpha_2(\delta_2 + \varepsilon_2)^2 + \left[x_1(t_0) - \frac{[v_1(t_0)]^2}{2(\alpha_1 + \beta_1)} - x_2(t_0) - S\right]$$

Formula 3 is as follows:

$$f_4(t_1) = \frac{x_1(t_0) - \frac{[v_1(t_0)]^2}{2(\alpha_1 + \beta_1)} - \left[x_2(t_0) + \frac{1}{2}(\gamma_2 + \beta_2)(\delta_2)^2 + (\gamma_2 + \beta_2)\delta_2(\varepsilon_2)\right]}{t_1 - t_0} +$$

$$\frac{\frac{1}{2}\beta_2(\varepsilon_2)^2 + ((\gamma_2 + \beta_2)\delta_2 + \beta_2\varepsilon_2)(t_1 - t_2^c) + \frac{1}{2}(\alpha_2 + \beta_2)(t_1 - t_2^c)^2 - S}{t_1 - t_0},$$

$$t_1 = -\frac{v_1(t_0)}{(A_1 + G_1)} + t_0; t_2^c = \delta_2 + \varepsilon_2 + t_0;$$

Formula 4 is as follows:

$$f_3(t_{n1}) = \frac{x_1(t_0) - \left[x_2(t_0) + \frac{1}{2}(\gamma_2 + \beta_2)(\delta_2)^2 + (\gamma_2 + \beta_2)\delta_2(\varepsilon_2)\right]}{t_{n1} - t_0} +$$

$$\frac{\frac{1}{2}\beta_2(\varepsilon_2)^2 + ((\gamma_2 + \beta_2)\delta_2 + \beta_2\varepsilon_2)(t_{n1} - t_2^c) + \frac{1}{2}(\alpha_2 + \beta_2)(t_{n1} - t_2^c)^2 - S}{t_{n1} - t_0} +$$

$$v_1(t_0) + \frac{1}{2}(\alpha_1 + \beta_1)(t_{n1} - t_0)$$

$$t_{n1} = \sqrt{\frac{E_1}{D_1}} + t_0; t_2^c = \delta_2 + \varepsilon_2 + t_0; \text{ and}$$

$$D_1 = \frac{1}{2}[(\alpha_1 + \beta_1) - (\alpha_2 + \beta_2)]; E_1 = \gamma_2(\delta_2)^2 - \frac{1}{2}\alpha_2(\delta_2 + \varepsilon_2)^2 + [x_1(t_0) - x_2(t_0) - S].$$

According to the above process, the following train can calculate the EBI velocity, according to the position, velocity and performance parameters of the preceding train and the position and performance parameters of the following train, as the safe constraint for the implementation of overspeed protection of the train (when the actual velocity exceeds the EBI velocity, the following train outputs emergency braking to decelerate to a stop).

The specific implementations of the present disclosure are further described below with reference to the accompanying drawings.

In the train running control system, the VOBC has the function of autonomous train velocity measurement and positioning. The VOBC can not only safely and accurately measure the position and running state information of the train on the line, but also obtain the related information of the line in combination with the internal stored electronic map, as an important supplement for train positioning. In the train control system of vehicle-vehicle communication, with the help of high-precision positioning and low-delay large-capacity communication technology, the information such as the velocity, position, acceleration and spatial-temporal trajectory of train running can be transmitted between trains through direct or indirect wireless communication. In addition, the train runs under protection of the ATP, the ATP calculates the EBI velocity according to the running state of the preceding train and the following train in two successive trains, and compares the train velocity with the calculated EBI velocity. In case of overspeed, the ATP immediately implements emergency braking to slow down the train until it stops.

In order to shorten the train tracking interval as much as possible, the preceding train needs to predict its own spatial-temporal trajectory of the braking process under the "most favorable" condition and sends it to the following train as the safe protection target of the following train. The following train shall calculate its own spatial-temporal trajectory under the "most unfavorable" condition, and calculate the EBI velocity according to the safe protection target of the preceding train and the principle of the whole spatial-temporal collision avoidance. The present disclosure is mainly based on the vehicle-vehicle communication train control system, but it is also applicable to the traditional communication-based train control (CBTC) where the information of the preceding train needs to be transferred by the zone controller (ZC) on the ground.

The specific implementation process of the present disclosure is described below.

Safe spatial-temporal trajectory information of the preceding train and the following train in two successive trains in a stopping process is calculated using an electronic map and autonomous velocity measurement and positioning information in combination with performance of the trains. The process is specifically as follows.

The trains can obtain their own velocity and position information using the velocity measurement and positioning technology. For example, the train 1 (preceding train) can obtain its own velocity and position information: $v_1(t_0)$ and $x_1(t_0)$. The train 2 (following train) can obtain its own velocity and position information: $v_2(t_0)$ and $x_2(t_0)$.

Using the electronic map stored on board and the train performance parameter information, the train can query the line slope acceleration and the train traction/braking performance parameters in real time. For example, the train 1 (preceding train) can obtain most unfavorable slope acceleration $\beta_1$ during emergency braking and maximum emergency braking acceleration $\alpha_1$. The train 2 (following train) can obtain most unfavorable slope acceleration $\beta_2$ from triggering of emergency braking to stopping, a duration of traction phase $\delta_2$, maximum traction acceleration $\gamma_2$, a duration of idling phase $\varepsilon_2$, and emergency braking acceleration $\alpha_2$ that is guaranteed under a most unfavorable condition.

The preceding train takes measured rear position and velocity information as an initial state, and calculates the curve of the position of the train changing with time during braking according to a model of a train immediately implementing emergency braking in combination with train braking performance and line parameters obtained by query. The following train takes measured train head position information and a to-be-solved variable (EBI velocity) as an initial state, and calculates the curve of the position of the train changing with time during braking according to a safe braking model stipulated in IEEE1474.1 in combination with train traction and braking performance and line parameters obtained by query.

Through direct or indirect communication between trains, the following train can directly obtain the position, velocity and acceleration information of the preceding train, namely, $v_1(t_0)$, $x_1(t_0)$, $\beta_1$, and $\alpha_1$.

Through direct or indirect communication between trains, the following train obtains the calculated spatial-temporal trajectory information of the preceding train (the curve of the position changing with time).

A safety condition (that is, $x_2(t) \leq x_2(t) - S$) is created by the following train according to a constraint that a position of the following train does not surpass a position of the preceding train at any time in combination with the spatial-temporal trajectory information of the preceding and following trains, and an EBI velocity of the following train is solved. That is, the EBI velocity of the following train at the initial time can be obtained by substituting the initial state information of the preceding and following trains ($v_1(t_0)$, $x_2(t_0)$ and $x_1(t_0)$) into the calculation formula for the EBI velocity $E_2(t_0)$ of the following train. In practice, since the actual parameters and initial state of the preceding and following trains are different, the EBI calculation formulas are also different, and corresponding calculation functions shall be selected according to different conditions. Specific classification conditions and calculation functions are shown as follows.

First, a duration of braking phase $\tau_1$ of the preceding train is calculated, namely, $$\tau_1 = -\frac{v_1(t_0)}{\alpha_1 + \beta_1}.$$

According to the magnitude relation of $\tau_1$, $\delta_2$, and $\varepsilon_2$, the EBI velocity $E_2(t_0)$ of the following train can be solved in the following two cases.

Figure 4A:
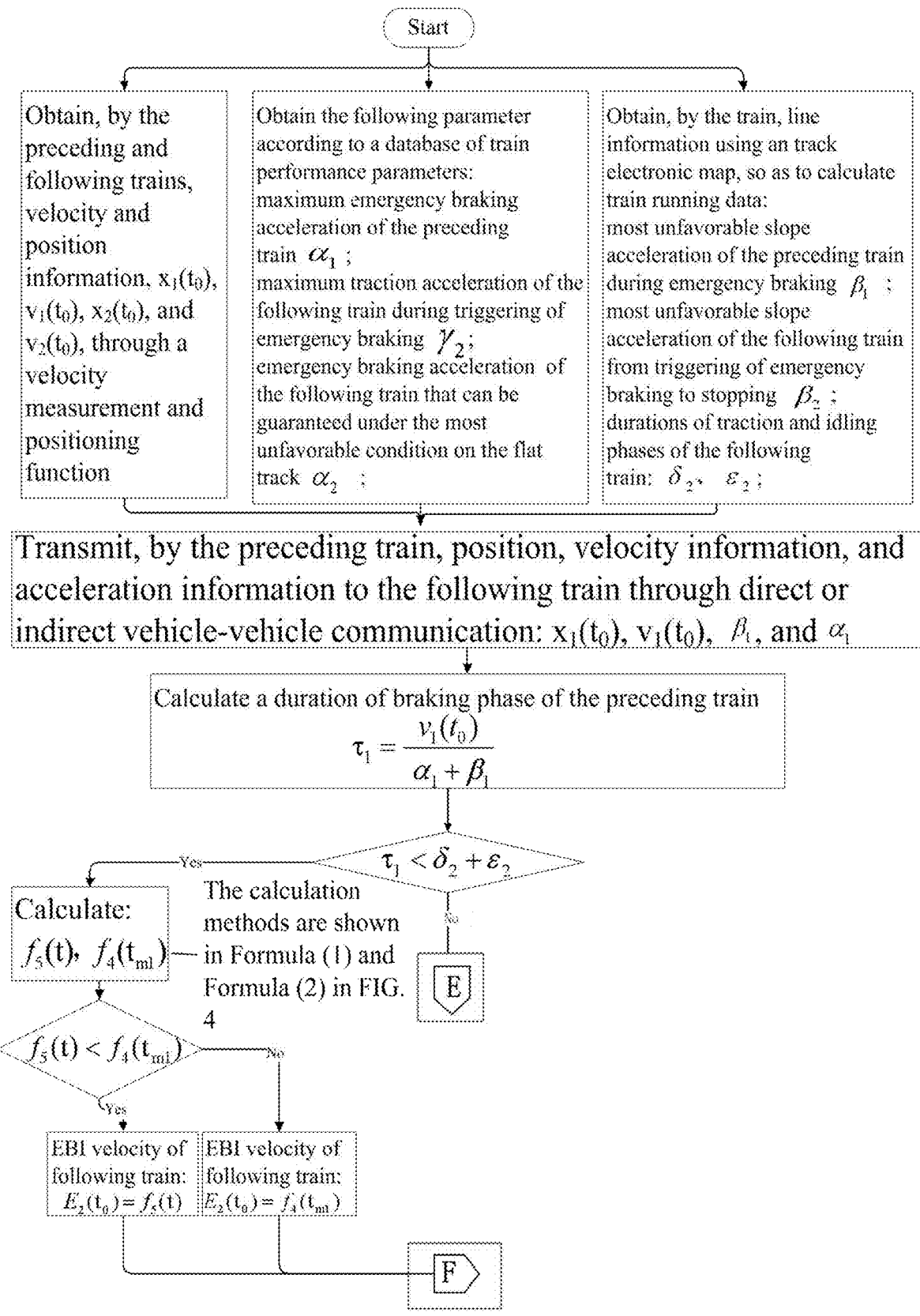
FIGS. 4A-4C show a flow diagram of a specific implementation of the relative velocity based train protection method of the present disclosure.
Figure 4B:
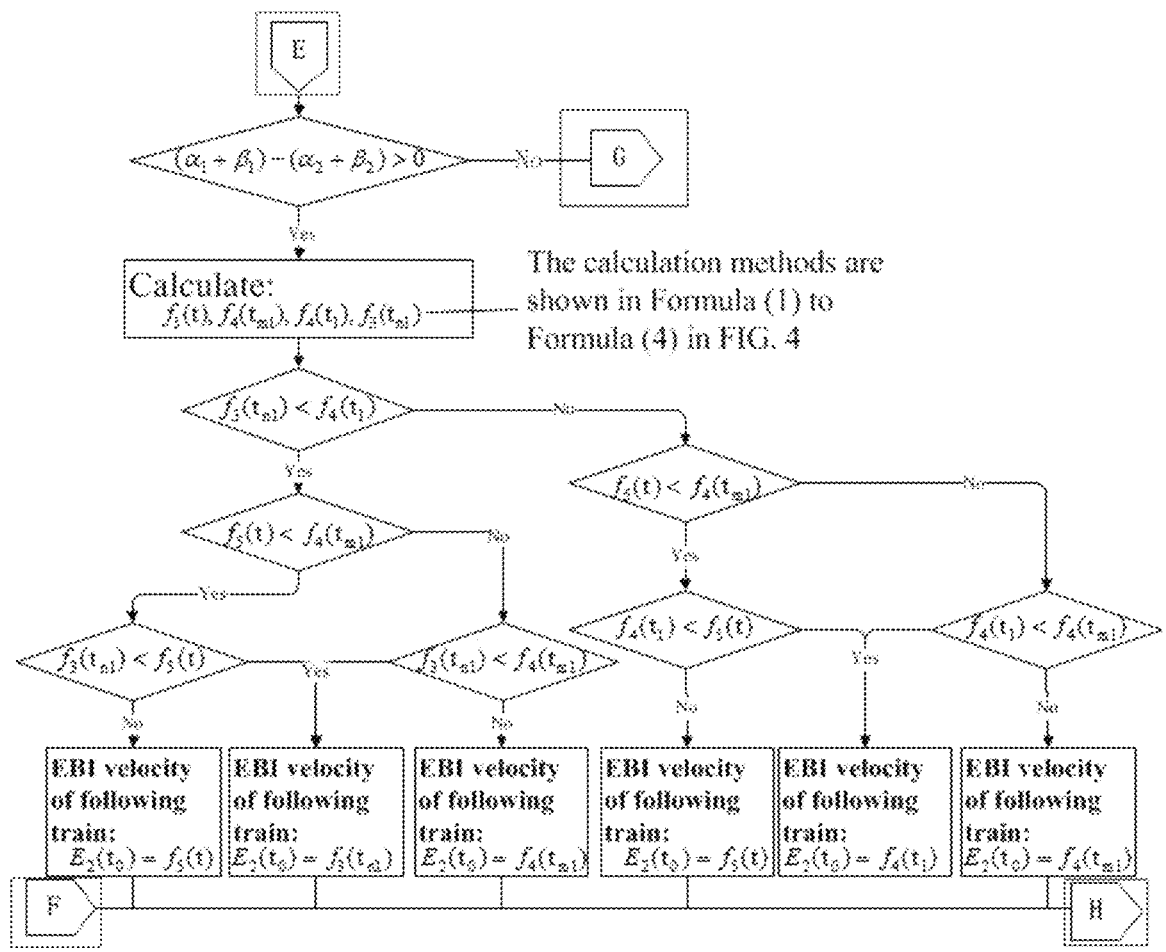
Figure 4C:
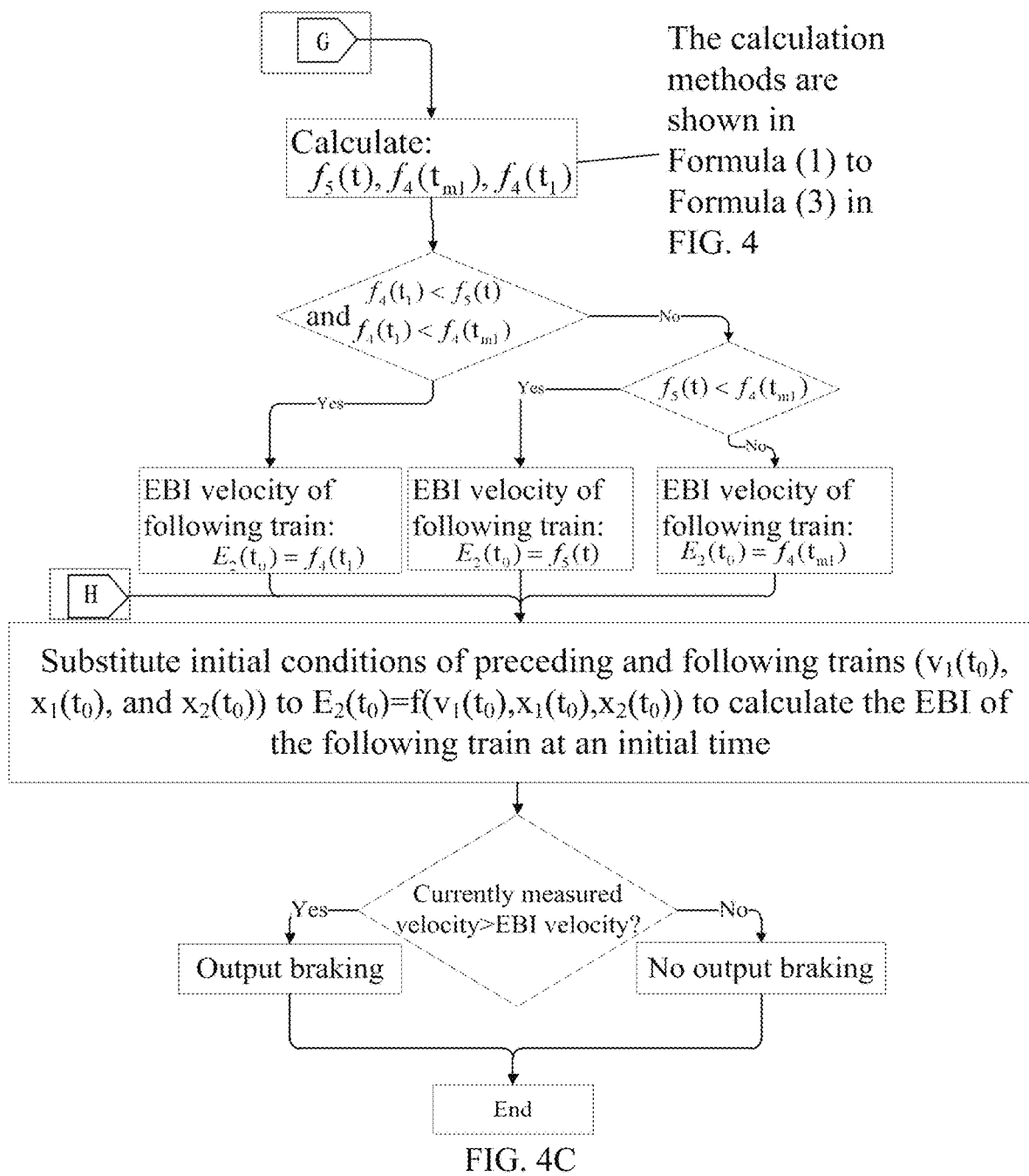

If $\tau_1 < \delta_2 + \varepsilon_2$,
according to Formula (1) and Formula (2) in FIGS. 4A-4C, the constraint of the initial velocity of the following train is calculated, namely, $v_2(t_0) \leq f_5(t)$ and $v_2(t_0) \leq f_4(t_{m1})$. At this time, the calculation method for the EBI velocity of the following train is calculated as follows:

$$E_2(t_0) = \min(f_5(t), f_4(t_{m1})).$$

If $\delta_2+\varepsilon_2 \leq \tau_1$, the magnitude relation between the braking performance of the preceding and following trains is first judged.

1) If $(\alpha_1+\beta_1)-(\alpha_2+\beta_2)>0$, according to Formula (1) to Formula (4) in FIGS. 4A-4C, the constraint of the initial velocity of the following train is calculated, namely, $v_2(t_0) \leq f_5(t)$, $v_2(t_0) \leq f_4(t_{m1})$, $v_2(t_0) \leq f_4(t_1)$ and $v_2(t_0) \leq f_3(t_{n1})$. At this time, the calculation method for the EBI velocity of the following train is calculated as follows:

$$E_2(t_0) = \min(f_5(t), f_4(t_{m1}), f_4(t_1), f_3(t_{n1})).$$

2) If $(\alpha_1+\beta_1)-(\alpha_2+\beta_2) \leq 0$, according to Formula (1) to Formula (3) in FIGS. 4A-4C, the constraint of the initial velocity of the following train is calculated, namely, $v_2(t_0) \leq f_5(t)$, $v_2(t_0) \leq f_4(t_{m1})$ and $v_2(t_0) \leq f_4(t_1)$. At this time, the calculation method for the EBI velocity of the following train is calculated as follows:

$$E_2(t_0) = \min(f_4(t_1), f_5(t), f_4(t_{m1})).$$

The EBI curve is used for overspeed protection of the train, that is, to compare whether the current measured velocity $v_2(t_0)$ of the following train exceeds the EBI velocity $E_2(t_0)$. If $v_2(t_0)>E_2(t_0)$, the emergency braking is output to decelerate the train to a stop, so as to avoid rear-end collision.

By adopting the vehicle-vehicle communication system and the above overspeed protection design method, the relative velocity based train protection can be realized, and the train tracking interval can be shortened to the maximum extent and the transportation efficiency of the urban rail system can be improved while ensuring no rear-end collision.

Figure 5:
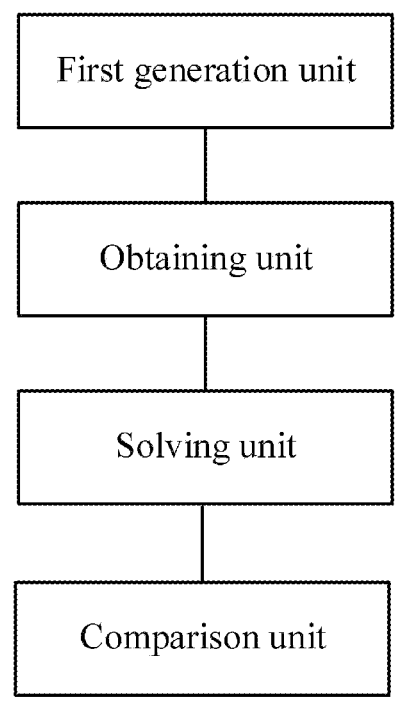
FIG. 5 is a structural diagram of a relative velocity based train protection apparatus of the present disclosure.

A structural diagram of a relative velocity based train protection apparatus provided by the embodiment of the present disclosure is shown in FIG. 5, includes: a first generation unit, an obtaining unit, a solving unit, and a comparison unit.

The first generation unit is configured to calculate safe spatial-temporal trajectory information of a preceding train and a following train in two successive trains in a stopping process using an electronic map and autonomous velocity measurement and positioning information in combination with performance of the trains. The safe spatial-temporal trajectory information includes: a curve of a position changing with time.

The obtaining unit is configured to obtain the safe spatial-temporal trajectory information of the preceding train by the following train through vehicle-to-vehicle communication.

The solving unit is configured to create a safety condition by the following train according to a constraint that a position of the following train does not surpass a position of the preceding train at any time in combination with the safe spatial-temporal trajectory information of the preceding train and the following train, and solve an EBI velocity of the following train.

The comparison unit is configured to determine, by the following train through comparison, whether a current measured velocity $v_2(t_0)$ of the following train exceeds the EBI velocity $E_2(t_0)$ of the following train, and output an emergency braking instruction to make the following train decelerate until the following train stops if $v_2(t_0)>E_2(t_0)$.

The specific process of relative velocity based train protection with the apparatus of the embodiment of the present disclosure is similar to the embodiment of the above method, which will not be repeated here.

The present disclosure has the following beneficial effects:

1. Compared with the traditional tracking and protection method of "hard wall collision", it effectively shortens the train tracking distance and improves the system transport capacity on the basis of ensuring safety.

2. Compared with the "soft wall collision" model in the Background, it can ensure the safety of the whole spatial-temporal tracking of trains with any performance combination and avoid rear-end collision.

Those skilled in the art should understand that the drawings are only schematic diagrams of an embodiment, and the components in the drawings are not necessary for implementing the present disclosure.

Those of ordinary skill in the art may understand that the components of the apparatus in the embodiment can be distributed in the apparatus in the embodiment according to the description in the embodiment, or can be changed accordingly and located in one or more apparatuses different from the embodiment. The components in the above embodiment can be combined into one component, or further disassembled into a plurality of sub-components.

The embodiments in this specification are described in a progressive manner. For same or similar parts between embodiments, reference may be made to each other. Each embodiment focuses on a difference from other embodiments. For an apparatus or system embodiment, since it is basically similar to the method embodiment, the description is relatively simple, and reference can be made to the description of the method embodiment. The apparatus or system embodiment described above is merely schematic, where the unit described as a separate component may or may not be physically separated, and a component displayed as a unit may or may not be a physical unit, that is, the component may be located at one place, or distributed on a plurality of network units. Some or all of the modules may be selected based on actual needs to achieve the objectives of the solutions of the embodiments. Those of ordinary skill in the art can understand and implement the embodiments without creative effort.

The above described are merely specific implementations of the present disclosure, and the protection scope of the present disclosure is not limited thereto. Any modification or replacement easily conceived by those skilled in the art within the technical scope of the present disclosure should fall within the protection scope of the present disclosure. Therefore, the protection scope of the present disclosure should be subject to the protection scope of the claims.

What is claimed is:

1. A relative velocity based train protection method, comprising the following steps:

step 1, calculating safe spatial-temporal trajectory information of a preceding train and a following train in two successive trains in a stopping process using an electronic map and autonomous velocity measurement and positioning information in combination with performance of the preceding train and the following train, wherein the safe spatial-temporal trajectory information comprises: a curve of a position changing with time;

step 2, obtaining the safe spatial-temporal trajectory information of the preceding train by the following train through vehicle-to-vehicle communication;

step 3, creating a safety condition by the following train according to a constraint that a position of the following train does not surpass a position of the preceding train at any time in combination with the safe spatial-temporal trajectory information of the preceding train and the following train, and solving an emergency brake intervention (EBI) velocity of the following train; and step 4, determining, by the following train through comparison, whether a current measured velocity $v_2(t_0)$ of the following train exceeds the EBI velocity $E_2(t_0)$ of the following train, and in response to $v_2(t_0) > E_2(t_0)$, outputting an emergency braking instruction to make the following train decelerate until the following train stops, wherein step 1 comprises the following sub-steps:

obtaining, by the preceding train, own velocity $v_1(t_0)$ and position information $x_1(t_0)$ using the velocity measurement and positioning technology, and obtaining, by the following train, own velocity $v_2(t_0)$ and position information $x_2(t_0)$;

obtaining, by the preceding train, most unfavorable slope acceleration $\beta_1$ during emergency braking and maximum emergency braking acceleration $\alpha_1$, and obtaining, by the following train, most unfavorable slope acceleration $\beta_2$ from triggering of emergency braking to stopping, a duration of traction phase $\delta_2$, maximum traction acceleration $\gamma_2$, a duration of idling phase $\varepsilon_2$, and emergency braking acceleration $\alpha_2$ that is guaranteed under a most unfavorable condition;

taking, by the preceding train, measured rear position and velocity information as an initial state, and calculating the curve of the position of the preceding train changing with time during braking according to a model of a train immediately implementing emergency braking in combination with train braking performance and line parameters obtained by query; and taking, by the following train, measured train head position information and EBI velocity as an initial state, and calculating the curve of the position of the following train changing with time during braking according to a safe braking model stipulated in IEEE1474.1 in combination with train traction and braking performance and line parameters obtained by query.

2. The method according to claim 1, wherein step 3 comprises the following sub-steps:

step 31, calculating a duration of braking phase $\tau_1$ of the preceding train, namely, $$\tau_1 = -\frac{v_1(t_0)}{\alpha_1 + \beta_1};$$

and step 32, according to the duration of braking phase $\tau_1$ of the preceding train, a duration of traction phase $\delta_2$ of the following train, a duration of idling phase $\varepsilon_2$ of the following train, the maximum emergency braking acceleration $\alpha_1$ within the duration of braking phase $\tau_1$ of the preceding train, the most unfavorable slope acceleration $\beta_1$ of the preceding train during emergency braking, the emergency braking acceleration $\alpha_2$ that is guaranteed under the most unfavorable condition of the following train, and the most unfavorable slope acceleration $\beta_2$ of the following train from triggering of the emergency braking to stopping, determining a calculation method for the EBI velocity of the following train.

3. The method according to claim 2, wherein step 32 comprises the following sub-steps:

in response to $\tau_1 < \delta_2 + \varepsilon_2$, calculating a constraint of an initial velocity of the following train, that is, in response to $v_2(t_0) \leq f_5(t)$ and $v_2(t_0) \leq f_4(t_{m1})$, calculating the EBI velocity of the following train as follows:

$$E_2(t_0) = \min(f_5(t), f_4(t_{m1}));$$

in response to $\delta_2 + \varepsilon_2 \leq \tau_1$ and $(\alpha_1 + \beta_1) - (\alpha_2 + \beta_2) > 0$, calculating a constraint of an initial velocity of the following train, that is, in response to $v_2(t_0) \leq f_5(t)$, $v_2(t_0) \leq f_4(t_{m1})$, $v_2(t_0) \leq f_4(t_1)$ and $v_2(t_0) \leq f_3(t_{n1})$, calculating the EBI velocity of the following train as follows:

$$E_2(t_0) = \min(f_5(t), f_4(t_{m1}), f_4(t_1), f_3(t_{n1}));$$

and in response to $\delta_2 + \varepsilon_2 \leq \tau_1$ and $(\alpha_1 + \beta_1) - (\alpha_2 + \beta_2) \leq 0$, calculating a constraint of an initial velocity of the following train, that is, in response to $v_2(t_0) \leq f_5(t)$, $v_2(t_0) \leq f_4(t_{m1})$ and $v_2(t_0) \leq f_4(t_1)$, calculating the EBI velocity of the following train as follows: $E_2(t_0) = \min(f_4(t_1), f_5(t), f_4(t_{m1}))$.

4. The method according to claim 3, wherein Formula 1 is as follows:

$$f_5(t) = -(\alpha_2 + \beta_2)\left(B + \sqrt{B^2 - \frac{2C}{\alpha_2 + \beta_2}}\right),$$

wherein $B = \dfrac{(\gamma_2 - \alpha_2)(\delta_2 + \varepsilon_2)}{\alpha_2 + \beta_2}$, and $$C = x_1(t_0) - \frac{[v_1(t_0)]^2}{2(\alpha_1 + \beta_1)} - \left[x_2(t_0) + \frac{1}{2}(\gamma_2 + \beta_2)(\delta_2)^2 + (\gamma_2 + \beta_2)\delta_2(\varepsilon_2) + \frac{1}{2}\beta_2(\varepsilon_2)^2 + \frac{[(\gamma_2 + \beta_2)\delta_2 + \beta_2\varepsilon_2]^2}{2(\alpha_2 + \beta_2)}\right] - S;$$

Formula 2 is as follows:

$$f_4(t_{m1}) = \frac{x_1(t_0) - \dfrac{[v_1(t_0)]^2}{2(\alpha_1 + \beta_1)} - \left[x_2(t_0) + \dfrac{1}{2}(\gamma_2 + \beta_2)(\delta_2)^2 + (\gamma_2 + \beta_2)\delta_2(\varepsilon_2)\right.}{t_{m1} - t_0} +$$

$$\frac{\left.\dfrac{1}{2}\beta_2(\varepsilon_2)^2 + ((\gamma_2 + \beta_2)\delta_2 + \beta_2\varepsilon_2)(t_{m1} - t_2^c) + \dfrac{1}{2}(\alpha_2 + \beta_2)(t_{m1} - t_2^c)^2\right] - S}{t_{m1} - t_0}$$

-continued $$N = x_2(t_0) + \frac{1}{2}(\gamma_2 + \beta_2)(\delta_2)^2 + (\gamma_2 + \beta_2)\delta_2(\varepsilon_2) + \frac{1}{2}\beta_2(\varepsilon_2)^2$$
$$+((\gamma_2 + \beta_2)\delta_2 + \beta_2\varepsilon_2)(t_{m1} - t_2^c) + \frac{1}{2}(\alpha_2 + \beta_2)(t_{m1} - t_2^c)^2 ;$$

$$t_{m1} = \sqrt{\frac{E}{D}} + t_0; t_2^c = \delta_2 + \varepsilon_2 + t_0; \text{ and}$$

$$D = -\frac{1}{2}(\alpha_2 + \beta_2) > 0; E = \gamma_2(\delta_2)^2 - \frac{1}{2}\alpha_2(\delta_2 + \varepsilon_2)^2 + \left[x_1(t_0) - \frac{[v_1(t_0)]^2}{2(\alpha_1 + \beta_1)} - x_2(t_0) - S\right].$$

Formula 3 is as follows:

$$f_4(t_1) = \frac{x_1(t_0) - \frac{[v_1(t_0)]^2}{2(\alpha_1 + \beta_1)} - \left[x_2(t_0) + \frac{1}{2}(\gamma_2 + \beta_2)(\delta_2)^2 + (\gamma_2 + \beta_2)\delta_2(\varepsilon_2)\right]}{t_1 - t_0} +$$
$$\frac{\frac{1}{2}\beta_2(\varepsilon_2)^2 + ((\gamma_2 + \beta_2)\delta_2 + \beta_2\varepsilon_2)(t_1 - t_2^c) + \frac{1}{2}(\alpha_2 + \beta_2)(t_1 - t_2^c)^2\right] - S}{t_1 - t_0} ;$$

$$P = x_2(t_0) + \frac{1}{2}(\gamma_2 + \beta_2)(\delta_2)^2 + (\gamma_2 + \beta_2)\delta_2(\varepsilon_2) + \frac{1}{2}\beta_2(\varepsilon_2)^2$$
$$+((\gamma_2 + \beta_2)\delta_2 + \beta_2\varepsilon_2)(t_1 - t_2^c) + \frac{1}{2}(\alpha_2 + \beta_2)(t_1 - t_2^c)^2$$

$$t_1 = -\frac{v_1(t_0)}{(A_1 + G_1)} + t_0; t_2^c = \delta_2 + \varepsilon_2 + t_0; \text{ and}$$

Formula 4 is as follows:

$$f_3(t_{n1}) = \frac{x_1(t_0) - \left[x_2(t_0) + \frac{1}{2}(\gamma_2 + \beta_2)(\delta_2)^2 + (\gamma_2 + \beta_2)\delta_2(\varepsilon_2)\right.}{t_{n1} - t_0} +$$
$$\frac{\frac{1}{2}\beta_2(\varepsilon_2)^2 + ((\gamma_2 + \beta_2)\delta_2 + \beta_2\varepsilon_2)(t_{n1} - t_2^c) + \frac{1}{2}(\alpha_2 + \beta_2)(t_{n1} - t_2^c)^2\right] - S}{t_{n1} - t_0} +$$
$$v_1(t_0) + \frac{1}{2}(\alpha_1 + \beta_1)(t_{n1} - t_0)$$

$$t_{n1} = \sqrt{\frac{E_1}{D_1}} + t_0; t_2^c = \delta_2 + \varepsilon_2 + t_0; \text{ and}$$

$$D_1 = \frac{1}{2}[(\alpha_1 + \beta_1) - (\alpha_2 + \beta_2)]; E_1 = \gamma_2(\delta_2)^2 - \frac{1}{2}\alpha_2(\delta_2 + \varepsilon_2)^2 + [x_1(t_0) - x_2(t_0) - S].$$

5. A relative velocity based train protection apparatus, comprising:
a first generation unit configured to calculate safe spatial-temporal trajectory information of a preceding train and a following train in two successive trains in a stopping process using an electronic map and autonomous velocity measurement and positioning information in combination with performance of the preceding train and the following train, wherein the safe spatial-temporal trajectory information comprises: a curve of a position changing with time;
an obtaining unit configured to obtain the safe spatial-temporal trajectory information of the preceding train by the following train through vehicle-to-vehicle communication;
a solving unit configured to create a safety condition by the following train according to a constraint that a position of the following train does not surpass a position of the preceding train at any time in combination with the safe spatial-temporal trajectory information of the preceding train and the following train, and solve an EBI velocity of the following train; and
a comparison unit configured to determine, by the following train through comparison, whether a current measured velocity $v_2(t_0)$ of the following train exceeds the EBI velocity $E_2(t_0)$ of the following train, and output an emergency braking instruction to make the following train decelerate until the following train stops in response to $v_2(t_0) > E_2(t_0)$, wherein
the first generation unit is specifically configured to:
obtain, by the preceding train, own velocity $v_1(t_0)$ and position information $x_1(t_0)$ using the velocity measurement and positioning technology, and obtain, by the following train, own velocity $v_2(t_0)$ and position information $x_2(t_0)$;
obtain, by the preceding train, most unfavorable slope acceleration $\beta_1$ during emergency braking and maximum emergency braking acceleration $\alpha_1$, and obtain, by the following train, most unfavorable slope acceleration $\beta_2$ from triggering of emergency braking to stopping, a duration of traction phase $\delta_2$, maximum traction acceleration $\gamma_2$, a duration of idling phase $\varepsilon_2$, and emergency braking acceleration $\alpha_2$ that is guaranteed under a most unfavorable condition;

take, by the preceding train, measured rear position and velocity information as an initial state, and calculate the curve of the position of the preceding train changing with time during braking according to a model of a train immediately implementing emergency braking in combination with train braking performance and line parameters obtained by query; and take, by the following train, measured train head position information and EBI velocity as an initial state, and calculate the curve of the position of the following train changing with time during braking according to a safe braking model stipulated in IEEE1474.1 in combination with train traction and braking performance and line parameters obtained by query.

6. The relative velocity based train protection apparatus according to claim 5, wherein the solving unit is further configured to:

calculate a duration of braking phase $\tau_1$ of the preceding train, namely, $$\tau_1 = -\frac{v_1(t_0)}{\alpha_1 + \beta_1};$$

and determine a calculation method for the EBI velocity of the following train, according to the duration of braking phase $\tau_1$ of the preceding train, a duration of traction phase $\delta_2$ of the following train, a duration of idling phase $\varepsilon_2$ of the following train, the maximum emergency braking acceleration $\alpha_1$ within the duration of braking phase $\tau_1$ of the preceding train, the most unfavorable slope acceleration $\beta_1$ of the preceding train during emergency braking, the emergency braking acceleration $\alpha_2$ that is guaranteed under the most unfavorable condition of the following train, and the most unfavorable slope acceleration $\beta_2$ of the following train from triggering of the emergency braking to stopping.

7. The relative velocity based train protection apparatus according to claim 5, wherein when the solving unit determines the calculation method for the EBI velocity of the following train, the solving unit is further configured to:

in response to $\tau_1 < \delta_2 + \varepsilon_2$, calculate a constraint of an initial velocity of the following train, that is, in response to $v_2(t_0) \leq f_5(t)$ and $v_2(t_0) \leq f_4(t_{m1})$, calculate the EBI velocity of the following train as follows:

$$E_2(t_0) = \min(f_5(t), f_4(t_{m1}));$$

in response to $\delta_2 + \varepsilon_2 \leq \tau_1$ and $(\alpha_1 + \beta_1) - (\alpha_2 + \beta_2) > 0$, calculate a constraint of an initial velocity of the following train, that is, in response to $v_2(t_0) \leq f_5(t)$, $v_2(t_0) \leq f_4(t_{m1})$, $v_2(t_0) \leq f_4(t_1)$ and $v_2(t_0) \leq f_3(t_{n1})$ calculate the EBI velocity of the following train as follows:

$$E_2(t_0) = \min(f_5(t), f_4(t_{m1}), f_4(t_1), f_3(t_{n1}));$$

and in response to $\delta_2 + \varepsilon_2 \leq \tau_1$ and $(\alpha_1 + \beta_1) - (\alpha_2 + \beta_2) \leq 0$, calculate a constraint of an initial velocity of the following train, that is, in response to $v_2(t_0) \leq f_5(t)$, $v_2(t_0) \leq f_4(t_{m1})$ and $v_2(t_0) \leq f_4(t_1)$, calculate the EBI velocity of the following train as follows: $E_2(t_0) = \min(f_4(t_1), f_5(t), f_4(t_{m1}))$.

8. The relative velocity based train protection apparatus according to claim 7, wherein
Formula 1 is as follows:

$$f_5(t) = -(\alpha_2 + \beta_2)\left(B + \sqrt{B^2 - \frac{2C}{\alpha_2 + \beta_2}}\right),$$

wherein $B = \dfrac{\gamma_2 - \alpha_2)(\delta_2 + \varepsilon_2)}{\alpha_2 + \beta_2}$, and $$C = x_1(t_0) - \frac{[v_1(t_0)]^2}{2(\alpha_1 + \beta_1)} - \left[x_2(t_0) + \frac{1}{2}(\gamma_2 + \beta_2)(\delta_2)^2 + (\gamma_2 + \beta_2)\delta_2(\varepsilon_2) + \frac{1}{2}\beta_2(\varepsilon_2)^2 + \frac{[(\gamma_2 + \beta_2)\delta_2 + \beta_2\varepsilon_2]^2}{2(\alpha_2 + \beta_2)}\right] - S;$$

Formula 2 is as follows:

$$f_4(t_{m1}) = \frac{x_1(t_0) - \frac{[v_1(t_0)]^2}{2(\alpha_1 + \beta_1)} - \left[x_2(t_0) + \frac{1}{2}(\gamma_2 + \beta_2)(\delta_2)^2 + (\gamma_2 + \beta_2)\delta_2(\varepsilon_2)\right.}{t_{m1} - t_0} +$$

$$\frac{\left.\frac{1}{2}\beta_2(\varepsilon_2)^2 + ((\gamma_2 + \beta_2)\delta_2 + \beta_2\varepsilon_2)(t_{m1} - t_2^c) + \frac{1}{2}(\alpha_2 + \beta_2)(t_{m1} - t_2^c)^2\right] - S}{t_{m1} - t_0}$$

$$N = x_2(t_0) + \frac{1}{2}(\gamma_2 + \beta_2)(\delta_2)^2 + (\gamma_2 + \beta_2)\delta_2(\varepsilon_2) + \frac{1}{2}\beta_2(\varepsilon_2)^2$$
$$+((\gamma_2 + \beta_2)\delta_2 + \beta_2\varepsilon_2)(t_{m1} - t_2^c) + \frac{1}{2}(\alpha_2 + \beta_2)(t_{m1} - t_2^c)^2 ;$$

$$D = -\frac{1}{2}(\alpha_2 + \beta_2) > 0; E = \gamma_2(\delta_2)^2 - \frac{1}{2}\alpha_2(\delta_2 + \varepsilon_2)^2 + \left[x_1(t_0) - \frac{[v_1(t_0)]^2}{2(\alpha_1 + \beta_1)} - x_2(t_0) - S\right];$$

Formula 3 is as follows:

$$f_4(t_1) = \frac{x_1(t_0) - \frac{[v_1(t_0)]^2}{2(\alpha_1 + \beta_1)} - \left[x_2(t_0) + \frac{1}{2}(\gamma_2 + \beta_2)(\delta_2)^2 + (\gamma_2 + \beta_2)\delta_2(\varepsilon_2)\right]}{t_1 - t_0} +$$

$$\frac{\frac{1}{2}\beta_2(\varepsilon_2)^2 + ((\gamma_2 + \beta_2)\delta_2 + \beta_2\varepsilon_2)(t_1 - t_2^c) + \frac{1}{2}(\alpha_2 + \beta_2)(t_1 - t_2^c)^2\Big] - S}{t_1 - t_0};$$

$$P = x_2(t_0) + \frac{1}{2}(\gamma_2 + \beta_2)(\delta_2)^2 + (\gamma_2 + \beta_2)\delta_2(\varepsilon_2) + \frac{1}{2}\beta_2(\varepsilon_2)^2$$
$$+ ((\gamma_2 + \beta_2)\delta_2 + \beta_2\varepsilon_2)(t_1 - t_2^c) + \frac{1}{2}(\alpha_2 + \beta_2)(t_1 - t_2^c)^2$$

$$t_1 = -\frac{v_1(t_0)}{(A_1 + G_1)} + t_0;\ t_2^c = \delta_2 + \varepsilon_2 + t_0;\ \text{and}$$

Formula 4 is as follows:

$$f_3(t_{n1}) = \frac{x_1(t_0) - \left[x_2(t_0) + \frac{1}{2}(\gamma_2 + \beta_2)(\delta_2)^2 + (\gamma_2 + \beta_2)\delta_2(\varepsilon_2)\right]}{t_{n1} - t_0} + \qquad (52)$$

$$\frac{\frac{1}{2}\beta_2(\varepsilon_2)^2 + ((\gamma_2 + \beta_2)\delta_2 + \beta_2\varepsilon_2)(t_{n1} - t_2^c) + \frac{1}{2}(\alpha_2 + \beta_2)(t_{n1} - t_2^c)^2\Big] - S}{t_{n1} - t_0} +$$

$$v_1(t_0) + \frac{1}{2}(\alpha_1 + \beta_1)(t_{n1} - t_0)$$

$$t_{n1} = \sqrt{\frac{E_1}{D_1}} + t_0;\ t_2^c = \delta_2 + \varepsilon_2 + t_0;\ \text{and}$$

$$D_1 = \frac{1}{2}[(\alpha_1 + \beta_1) - (\alpha_2 + \beta_2)];\ E_1 = \gamma_2(\delta_2)^2 - \frac{1}{2}\alpha_2(\delta_2 + \varepsilon_2)^2 + [x_1(t_0) - x_2(t_0) - S].$$

\* \* \* \* \*